July 28, 1936.    D. F. McCORMICK    2,049,071
METHOD AND APPARATUS FOR TREATING AND FILTERING CLAY SLIP
Original Filed May 12, 1931    3 Sheets-Sheet 3
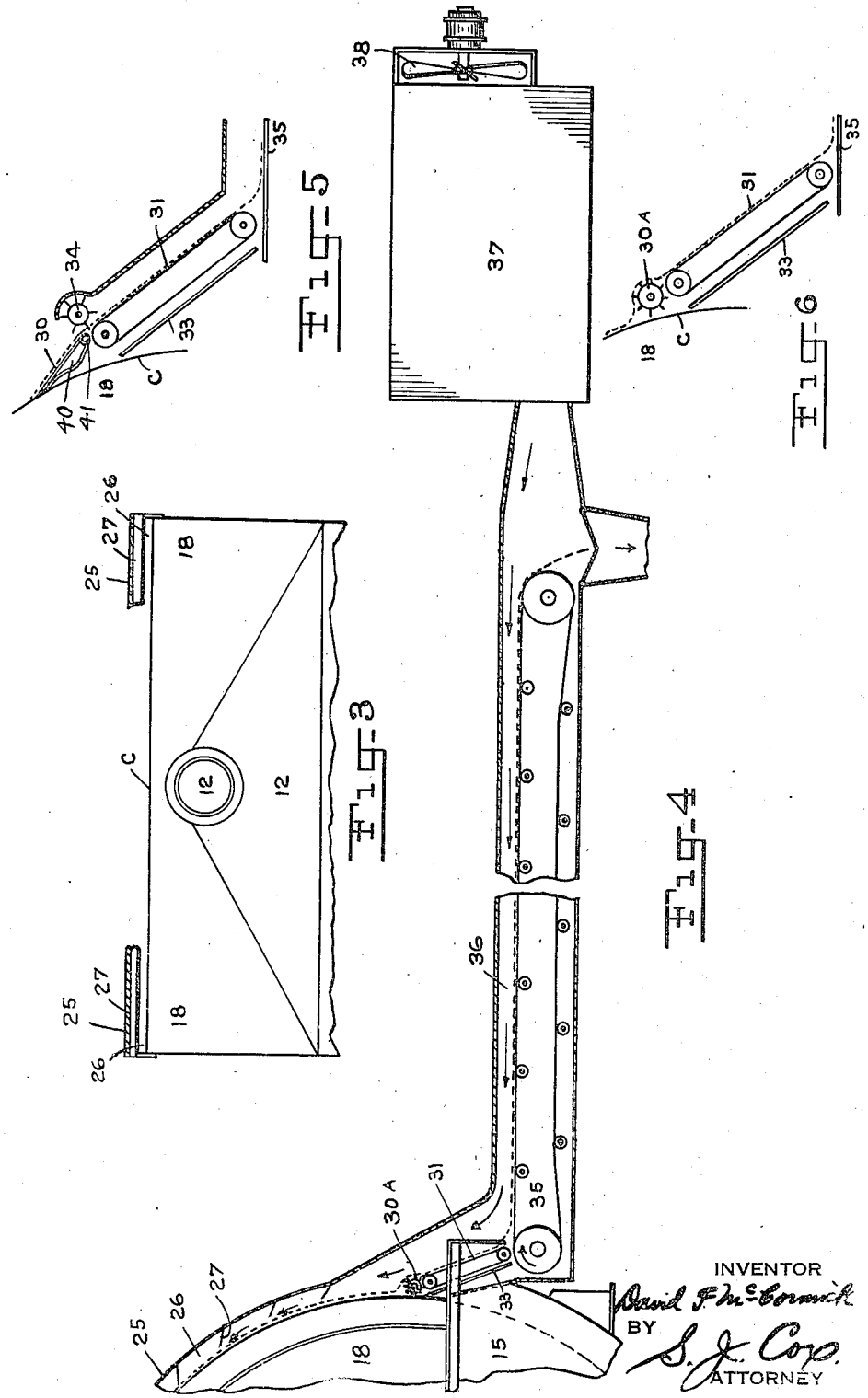

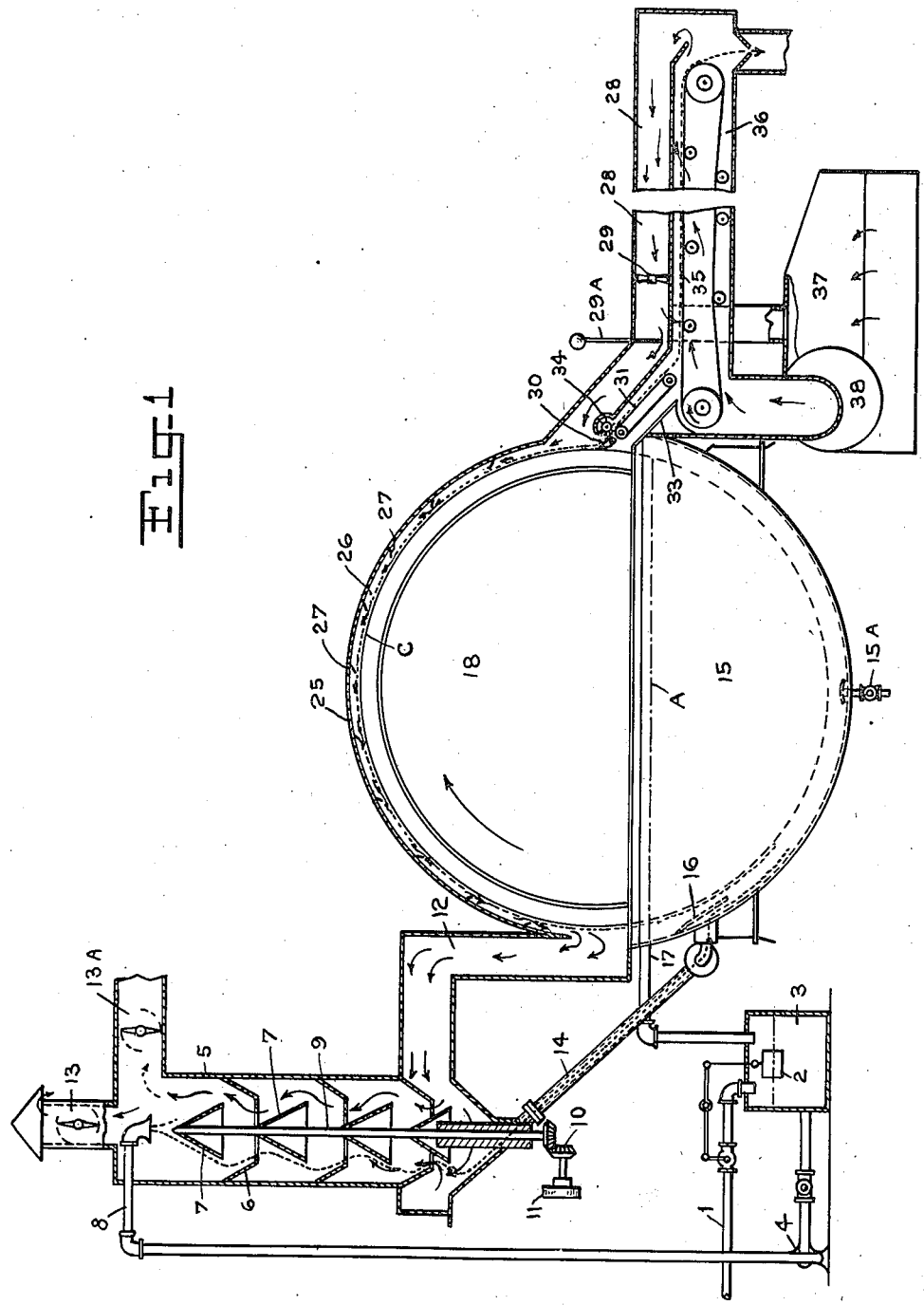

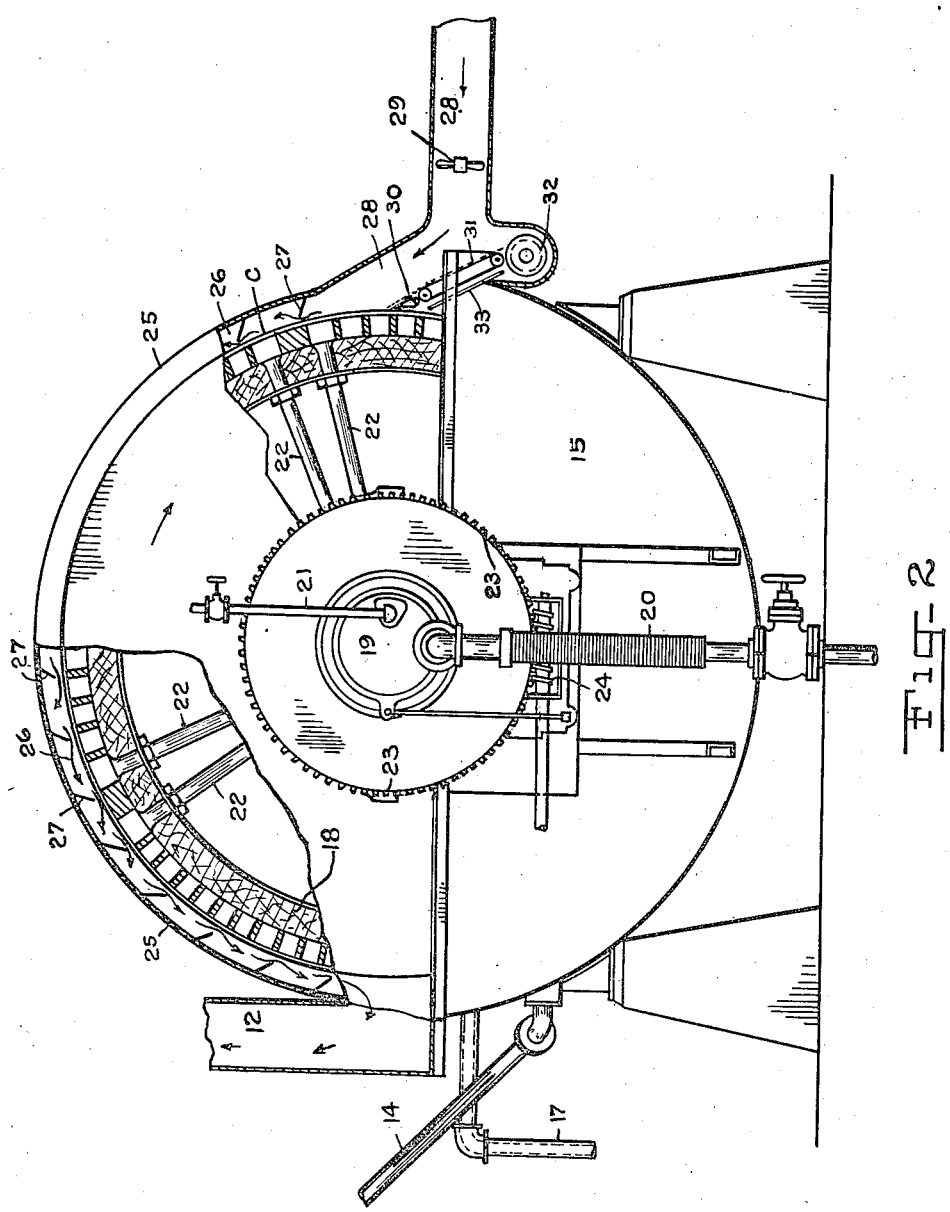

Patented July 28, 1936

2,049,071

UNITED STATES PATENT OFFICE 2,049,071

METHOD AND APPARATUS FOR TREATING AND FILTERING CLAY SLIP

David F. McCormick, Ellard, Va., assignor to Kaolin Processes Inc., Elizabeth, N. J., a corporation of New Jersey Original application May 12, 1931, Serial No. 536,955, now Patent No. 1,930,247, dated October 10, 1933. Divided and this application September 14, 1933, Serial No. 689,439

6 Claims. (Cl. 210—199)

The present application is a divisional application of my original application for Method of treating clay, Serial No. 536,955, filed May 12, 1931.

In that application, I described and claimed methods of refining crude clay by a combined dry and wet process whereby the removal of the impurities is facilitated and the resulting product is pure clay with substantially no waste. Upon reference to said application, now Patent No. 1,930,247, issued Oct. 10, 1933, it will appear that several steps in the methods, and apparatus for carrying out those steps, are described, and that they play an important part and contribute to the efficient handling of the product, and promote economy in power and increase in output. One of these steps and the apparatus for practicing same, relates to filtering the slip for the recovery of the clay, as well as to the treatment of the slip before filtering and to the treatment of the filter cake during formation and after discharge. The present application is directed to these features.

As outlined in my patent aforementioned, wet processes of refining clay have necessarily involved a filtering step, wherein filter presses are employed and their necessary manipulation by hand, renders the entire operation sluggish and intermittent. Furthermore, the handling of these presses is uneconomical in time and labor, and therefore retards the refining operation. However, peculiar properties of clay have presented difficult problems in the filtering field, so that the conventional presses, though uneconomical and cumbersome had to be resorted to. Although uninterrupted or continuous filtering has met with success in various fields, the peculiarities of the clay slip and the clay cake, heretofore have presented problems which have defied economical solution.

The present improvements, therefore, have as their primary object, the provision of novel means and methods for treating clay slip before, during and after filtering, so as to present an efficient and continuous filtering method. The adaptation of certain conventional filtering means, for the efficient filtering of clay slip, constitutes a further object.

Another object is to provide novel means and methods for preheating the clay slip before it is subjected to the filtering step.

A further object of the improvements is to provide a novel type of filter unit having novel features of construction. Improved methods of treating the slip and cake during filtering, constitute another object. Heating the continuously discharging filter cake, is a further object.

Among other features, the present improvements have for their object, the provision of a means for heating and drying the filter cake as it is being formed and dewatered. This means may take the form of a hood or other conduit means for directing heated air or gases onto the filter drum. A further object is to provide improved means and methods for removing the clay cake from the filter media; so as to prevent sticking.

A general object of the improvements is the provision of a filtering means and method which is successful, efficient and economical in the refinement of clay.

Other objects and advantages, will be apparent to those skilled in the art upon reference to the accompanying specification and drawings, in which Figure 1 is a diagrammatic view of the present improvements, illustrating the novel means for practicing the novel methods;

Figure 2 is an end elevation, with parts broken away, illustrating the novel filter unit, with a modified conveyor and drier;

Figure 3 is a fragmentary detail of the drum, baffles and air conduit of Figure 1;

Figure 4 is a diagrammatic view of another modified form of conveyor and drier;

Figure 5 is an enlarged detail of the mechanical scraper illustrated in Figure 1;

Figure 6 is an enlarged detail of the mechanical scraper illustrated in Figure 4.

Referring to the drawings, the shell or stack 5 (Fig. 1), is equipped with stationary funnel-shaped partitions 6 which cooperate with rotary, or stationary, conical discs or baffles 7 to provide a cascade for the slip which is fed to the top of the cylinder through pipe 8. The baffles or discs 7 are mounted on shaft 9 driven by gears 10 and wheel 11 from any suitable power source. It is not always necessary to revolve these discs in which case they remain stationary. This unit serves as a heat interchanger and for this purpose a hot air conduit 12 empties into the lower end of the cylinder, the heated air and gases ascending the cascade and leaving by the flue 13. If desired, the valves in conduits 13 and 13A can be set so that the heated air may be led through 13A instead of 13 to a condenser or other unit for further use with other units so that eventually only a small fraction of the heat employed, is wasted.

The conical base of the stack or cylinder 5 communicates with pipe 14 which leads to the tank or well 15 of the filter unit. A baffle 16 is provided opposite the entrance of the pipe so that the oncoming slip or sludge will not flow directly against the filtering medium. The slip may reach the level indicated by line A (Fig. 1), where an overflow pipe 17 connects the well 3 with the feed pump 4.

Associated with the tank or well 15 is the filter drum 18 which may be of any suitable construction having a peripheral surface of cloth C (Fig. 2) or other filtering material. The drum may be divided into a plurality of sectors, as is customary in the art, to each of which suction or pressure may suitably be applied through a regulating valve 19. A vacuum hose 20 and a compressed air pipe 21 communicates with the valve, which controls the application of suction or pressure through the pipes 22 which terminate in various sectors of the drum. It is understood that the drum 18 is revolved by gear 23 and worm 24 through the slip in the tank, and the suction will pick up the clay in the form of a cake on the periphery of the drum, the filtered liquid being drawn off in a known manner. Near the end of the travel of the drum, the suction may be replaced by pressure for assisting in the removal of the cake, as hereafter described.

As illustrated, the exposed portion of the filter surface of the drum 18 is encased in a hood or other stationary member 25 which is suitably spaced from the drum so as to form a passageway 26 therewith. A series of baffles 27 may be disposed in said passageway for directing air toward the drum. At spaced points along the hood, means are provided for admitting and withdrawing air beneath the hood. For example, a heated air conduit 28 (Figs. 1 and 2) communicates with the hood 25 at one side of the drum, while conduit 12 of the slip preheater, connects with the air passageway at the other side. Any suitable means may be provided for supplying heated air or gases to conduit 28, which may be driven through the hood and to the slip preheater by any suitable means such, as fan 29, and regulated by gate 29A. Should the natural draft of the flue 13 be insufficient to maintain the heated air in circulation from conduit 28, through the hood, through conduit 12 and the stack, any suitable means, such as a fan or the like, may be supplied in the flues 13, or 13A, as auxiliaries.

In use, the heating of the slip or sludge precedes the filtering operation. It is estimated that this preliminary treatment of the slip during which its temperature is raised to approximately 140° F. will raise the density of the sludge and thereby increase the capacity of the filter to a marked degree. The sludge or thickened slip containing about 30 to 40 percent of solids reaches the pipe 8 from a pump 4 (Fig. 1) which draws its supply from the feed well 3. The slip in this well is kept at a constant level by a float valve 2 that regulates the incoming slip provided from the previous unit, such as a Dorr thickener, through pipe 1 as set forth in my aforementioned patent. From pipe 8 the slip is passed into the top of the cylinder or stack 5, whence it falls through successive cascades which retard its gravitation, while exposed to the ascending heated air supplied through conduit 12. The hot air current which preferably constitutes the hot air discharged from the filter hood, has a temperature of substantially 190° F. which has been found to be adequate in the heat interchanger, to raise the slip to approximately 120° to 140° F. which appears to be the most efficient operating temperature for the filtering stage. The general direction of the slip is indicated in the drawings in dash lines, while arrows mark the travel of the air currents. Although not shown in the drawings, it is understood that the slowly descending slip and ascending air are intimately exposed for effecting the heat transfer.

The heated slip or sludge now passes by pipe 14, to the tank or well 15 where it may be maintained, if desired, by overflow pipe 17, at level A. In order to keep the slip at 120° to 140° F. it is often necessary to add steam or heated air or gases into well 15. This is done through several openings 15A at the bottom of the well so that the heat will circulate equally throughout the contents of well 15. In this unit the filtering of the heated slip transpires, the filter drum 18 is revolved in a clockwise direction at a speed of approximately one revolution in twelve minutes. For the major portion of this travel, the regulating valve 19 establishes communication between the vacuum line 20 and the pipes 22, so that suction is applied to the under face of the filter cloth C. As each sector of the drum passes through the tank or well 15, the suction imposed on the filter cloth causes extraction of some of the water from the slip with the attendant deposit of a clay cake about one-sixteenth to one-eighth of an inch thick on the periphery of the drum.

The suction in pipes 22 is maintained as the sector of the drum emerges from the well 15. The clay cake on the drum thereupon becomes exposed to the heated air or gas current in the hood 25, and is slowly moved in a clockwise direction, as the hot air current passes in a direction counter thereto. The baffles 27 are slightly inclined so that they direct the air toward the drum, whereby it impinges the outer face of the cake. These baffles may not be needed in some instances and can be omitted. Furthermore, the hot air currents may be passed over the cake in the direction of its travel, without departing from the scope of the invention. During this phase of the operation, the under face of the cake is subjected to suction for the further extraction of moisture, while the outer face of the cake is subjected to the heated air and gases, a portion of which is drawn into or through the interstices of the clay cake for further heating and drying.

The heated gases are supplied by a hot air furnace or other heater and are propelled therefrom through conduit 28 by fan 29 at a regulated speed, adjusted by gate 29A to properly treat the volume of clay filtered. Upon leaving the furnace, the air may be about 200° F. if used only for the filter, or filter and preheater. When the hot air and gases are used for the drying units as well (shown in Figs. 1 and 4) they may be heated to 300° and up to 600° F., and over, when traveling with the cake to be dried, and then returned to the filter hood at about 200° F. and for recirculating through the furnace 37. For a 75 ton clay capacity unit when the fan is properly regulated in speed and volume for delivering approximately 1700 cubic feet per minute to the hood, the temperature of the air propelled through the hood 25 is kept at about 200° F. From thence it goes through the conduit or pipe 12 (Fig. 1) to the preheater, and is exhausted to the atmosphere or used further in a condenser to save the water.

Referring again to the clay cake on the drum periphery, the heating and drying with the concurrent application of suction presents a combined treatment which increases the efficiency of the unit for clay filtering, and facilitates removal of the cake from the drum. It is well known that clay possesses peculiar adhering qualities, and displays an affinity for filter cloth and the like. However, in the practice of the present methods, the clay cake has been removed from the drum with marked success. This may be attributed, in part, to the application of heat to the slip as well as to the cake. It is probable, that the suction of the heated air through the cake, not only dries and heats the latter, but has a similar effect on the filter cloth so that any film of moisture between the face of the cake and the cloth is removed.

The heating and drying of the filter cloth and cake continues as the sector of the drum approaches the inlet of the hood. At this point a scraper 30 (Figs. 1 and 2) or doctor roll 30A (Fig. 4) or any other suitable mechanical means is provided for removing the cake from the drum. Furthermore, the regulating valve 19, automatically cuts off the vacuum connection, and air under pressure is thereupon admitted to pipes 22. This air pressure is directed against the under face of the filter cloth and cake, while the outer face of the cake is still subjected to heated air. These factors cooperate with the mechanical scraper 30 or doctor roll 30A for speedily and efficiently removing the cake from the drum, whence it is discharged onto a wire mesh belt conveyor 31 for distribution onto a dryer belt 35 or into a screw conveyor 32 (Fig. 2), or other suitable means for passage to the next unit, such as a rotary drier, or some other type of suitable drier. To prevent spill an apron 33 is placed at a steep angle between the drum discharge beneath the scraper or doctor roll and belt 31 to catch small particles and deliver them onto the final conveyors. When the dryer belt combination is used, a butterfly baffle 34 (Figs. 1 and 5) should be placed between the 200° F. air and the 300° F., or hotter, air passages to keep them from commingling. This butterfly valve is made to revolve at a slightly faster speed than the traveling cake passing the lip of the scraper 30.

At the end of the filtering operation, the filter cake together with clay particles lodged in the meshes of the filter, in the apparatus employed, is approximately 70 percent solids and 30 percent water. This is made possible by the preheating of the thick slip before passing it to the filter and the further heating and drying of the cake while it passes up and around under the hood. The heating of the slip accelerates filtration of the water, tends to keep the filter meshes clear and to prevent too close adherence of the solids to the filter, while the heating of the cake above the liquid level not only dries the cake and renders it more firm in consistency, but makes its separation from the filtering medium easier.

After the removal of the cake, when air pressure is used, it blows the cloth clear of any remaining particles, and as the drum sector passes below the level of the liquid in well 15, the air pressure is automatically turned off and the suction turned on by valve 19, so that as the sector submerges, another filtering operation begins. While the operation has been described as applied to a sector of the drum, it is understood that the entire circumference of the drum functions in like manner.

It is apparent that the provision of air pressure and/or a mechanical scraper for either individually or jointly removing the cake from the filtering medium is illustrative only. One or both may be discarded in favor of other suitable means for removing the cake and cleaning the filter medium. Various other arrangements for performing these functions may accordingly be adopted without departing from the scope of the improvements.

Referring to Figures 1 and 4, alternate types of conveyor and drier are illustrated. These may appropriately be termed a tunnel drier wherein an endless belt conveyor 35 is disposed in the tunnel 36, which for a 75 ton capacity filter unit may be some 125 feet long and have a belt or conveyor 42 inches wide. Heated air, supplied by the hot air furnace 37, is driven by fan 38, or other suitable means, through the tunnel and over the belt carrying the clay cakes which have been deposited thereon from the filter drum. As illustrated, the heated air passes from the tunnel to the hood 25 and thence over the filter drum and to the preheater. The cakes are conveyed along the tunnel in a direction with (as shown in Fig. 1) or counter to (shown in Fig. 4) the blast of heated gases passing therethrough, so that they are exposed on both faces to the heating and drying action of the gases. If this combined form of filter and drier is not used, the cake may be conveyed to a rotary type of drier or some other drier suitable for the purpose.

Referring more particularly to the mechanical take off means illustrated in Figs. 1, 2, and 5, the scraper 30 preferably comprises an elongated blade of sheet iron or other suitable material. A hollow chamber 40 is provided beneath the blade into which hot air and gases may be introduced through trunnion 41 about which the blade swings. Any suitable energized means such as a spring or a weight (not shown) may be employed for urging the blade against the drum during the filtering operation. The blade and chamber 40 extend along the face of the drum, so that the hot air and gases may be admitted at one end of the scraper, may circulate through chamber 40, and be freed therefrom at the other end. If desired, a perforated pipe may serve the double function of introducing and freeing the air and gases to and from chamber 40, and may serve as trunnions or bearings about which the blade may swing. The cake from the drum engages the hot plate of the scraper 30 and slides over it onto the moving woven wire belt 31 for delivery to the conveyor 32 or belt 35. The heated scraper facilitates removal of the cake from the drum.

Referring to Figs. 4 and 6, the doctor roll 30A comprises a cylinder, extending along the face of the drum, having a plurality of radially extending flexible rubber ribs or fins which touch the drum 10 and conveyor 31. This roll is equipped to revolve at a speed slightly in excess of that of the drum to facilitate transfer of the cake to conveyor 31, which in turn is equipped to travel slightly faster than the doctor roll.

Various modifications of the apparatus as well as of the methods will be apparent to those skilled in the art and may be made without departing from the scope and purview of the improvements. For example, the improvements may be practiced irrespective of the type of filter medium employed. The filtering surface may be flat or curved and the deposit or cake formed on the convex or concave face without departing from the invention.

I claim:

1. The process of treating a slip or sludge composed of clay and water for separating the solid particles from the liquid comprising the steps of cascading the slip, and concurrently subjecting the slip to heated air, filtering the slip thus heated and thereby forming a cake of the clay particles, subjecting the cake to heated air during the filtering step, and positively removing the cake from the filtering media.

2. Means for treating and filtering clay slip comprising a vertical stack having stationary cone shaped baffles, a set of cones in juxtaposition to said baffles, an inlet port for clay slip at the top of said stack for discharging slip downward about said baffles and cones, an outlet from the bottom of said stack, a well communicating with said outlet, a filter drum suspended in said well and projecting above same, a stationary hood spaced from the exposed face of said drum, and forming an air passage therewith, a conduit establishing communication between said air passage and the bottom of the stack, and means for circulating heated air in said hood and stack.

3. Means for treating and filtering clay slip comprising a vertical stack having stationary cone-shaped baffles, a set of revolving cones in juxtaposition to said baffles, an inlet port for clay slip at the top of said stack for discharging slip downward about said baffles and cones, an outlet from the bottom of said stack, a covered well communicating with said outlet and provided with heater inlets for steam or hot air, a filter drum suspended in said well and projecting above same, a stationary hood spaced from the exposed face of said drum, and forming an air passage therewith, a conduit establishing communication between said air passage and the bottom of the stack, and means for circulating heated air in said hood and stack.

4. Means for treating and filtering clay slip comprising a stack, means for feeding clay slip to said stack, an outlet for said stack, a receptacle communicating with said stack, means for filtering the slip fed from the stack to the receptacle, a source of heated air, and means for directing heated air from said source over said filter cake and into said stack.

5. Means for treating and filtering clay slip comprising a stack, means for feeding clay slip to said stack, an outlet for said stack, a receptacle communicating with said stack, means for filtering the slip fed from the stack to the receptacle, a drier, means for transferring the filter cake from the filtering means to the drier, a source of heated air, and means for directing heated air from said source to said drier, filtering means and stack.

6. In a filter, the combination of a filter medium and a heated mechanical scraper for removing the deposit from the medium, said scraper having a chamber and means for introducing heated air into said chamber for heating said scraper.

DAVID F. McCORMICK.